United States Patent [19]
Satoh et al.

[11] Patent Number: 5,698,235
[45] Date of Patent: Dec. 16, 1997

[54] EXTRUSION SCREW FOR EXTRUDER

[75] Inventors: Toru Satoh, Kawaguchi; Naoharu Obuchi, Kodaira, both of Japan

[73] Assignee: Bridgestone Corporation, Tokyo, Japan

[21] Appl. No.: 702,186

[22] Filed: Aug. 23, 1996

[30] Foreign Application Priority Data

Aug. 25, 1995 [JP] Japan ................... 7-240699

[51] Int. Cl.$^6$ .................................. B29C 47/62
[52] U.S. Cl. ............... 425/208; 264/211.21; 366/81; 366/88; 366/89
[58] Field of Search .................. 425/208, 209; 264/211.21, 211.23; 366/81, 88, 89, 90

[56] References Cited

U.S. PATENT DOCUMENTS

| | | | |
|---|---|---|---|
| 2,627,089 | 2/1953 | Norwood | 425/208 |
| 3,702,512 | 11/1972 | Schippers et al. | 366/81 |
| 3,897,938 | 8/1975 | Kim | 366/88 |
| 4,384,837 | 5/1983 | Murai et al. | 366/81 |
| 4,896,969 | 1/1990 | Dray | 366/88 |
| 5,063,016 | 11/1991 | Bauer et al. | 425/208 |

FOREIGN PATENT DOCUMENTS 62-103122  5/1987  Japan ..................... 425/208

OTHER PUBLICATIONS

SPIREX Literature, Screw and Barrel Technology, Youngstown, Ohio, pp. 3–42, 1985.

*Primary Examiner*—Jay H. Woo
*Assistant Examiner*—Joseph Leyson
*Attorney, Agent, or Firm*—Oliff & Berridge

[57] ABSTRACT

An extrusion screw (13) for an extruder (11) includes a screw shaft (24) which is rotatably arranged in a cylinder barrel (12). A main flight (25) and an auxiliary flight (26) are helically provided on the outer peripheral surface of the screw shaft (24). The trailing ends (25a, 26a) of these flights (25, 26) are spaced from each other by a half turn in the circumferential direction (A) of the screw shaft (24). A main flight groove (32) is formed between the front wall surface (27) of the main flight (25) and the rear wall surface (29) of the auxiliary flight (26). An auxiliary flight groove (31) is formed between the front wall surface (28) of the auxiliary flight (26) and the rear wall surface (30) of the main flight (25) to have a second cross-sectional area. The cross-sectional area of the auxiliary flight groove (31) decreases in a direction from the leading end (26b) to the trailing end (26a) of the auxiliary flight (26).

11 Claims, 4 Drawing Sheets

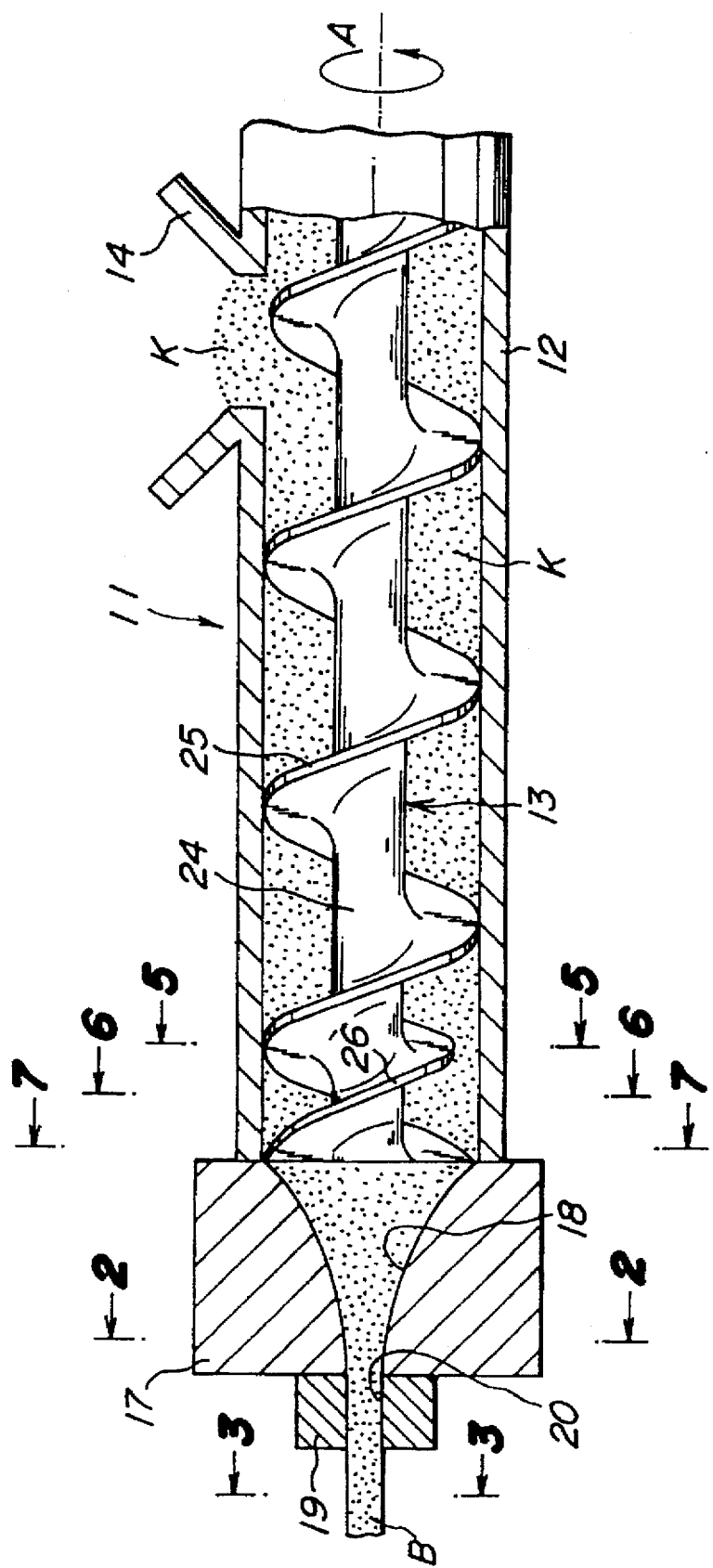

FIG_2
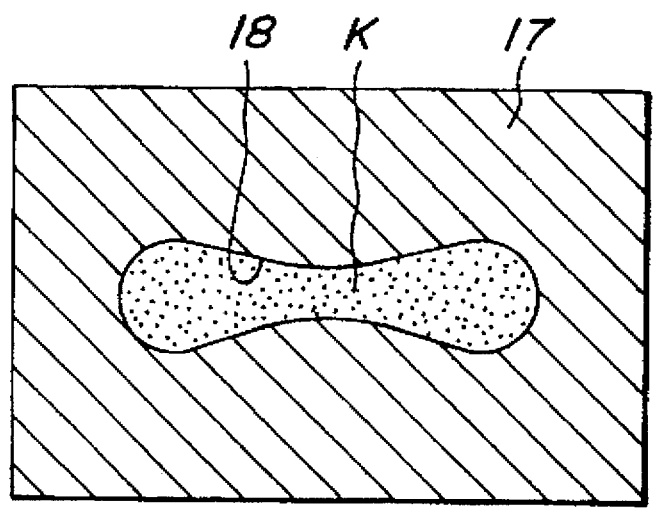
FIG_3
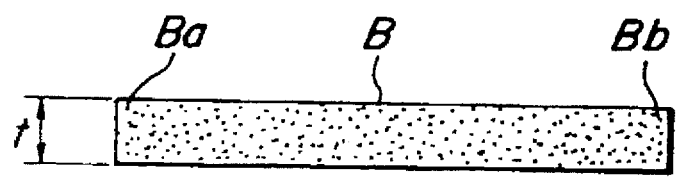

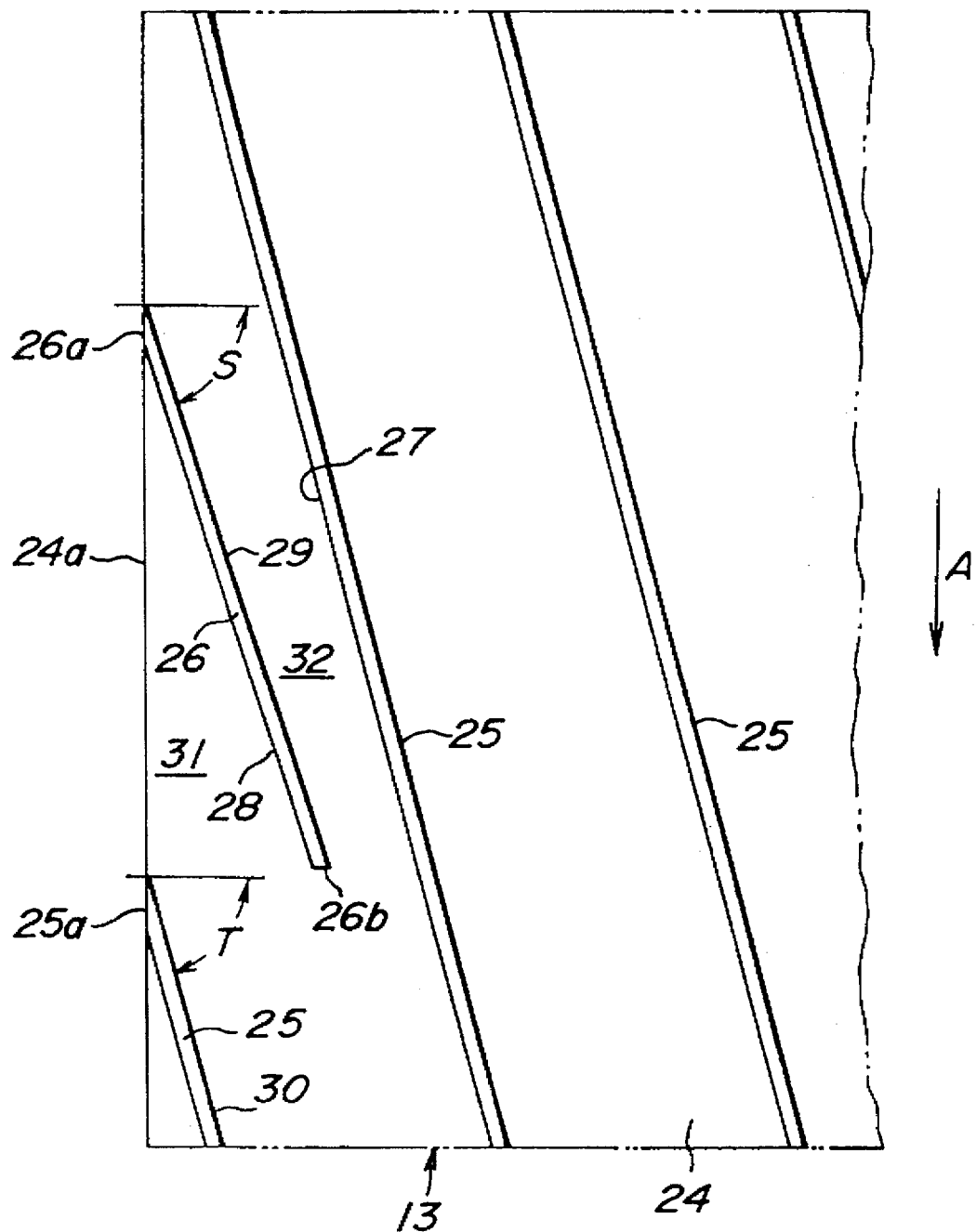
FIG_4

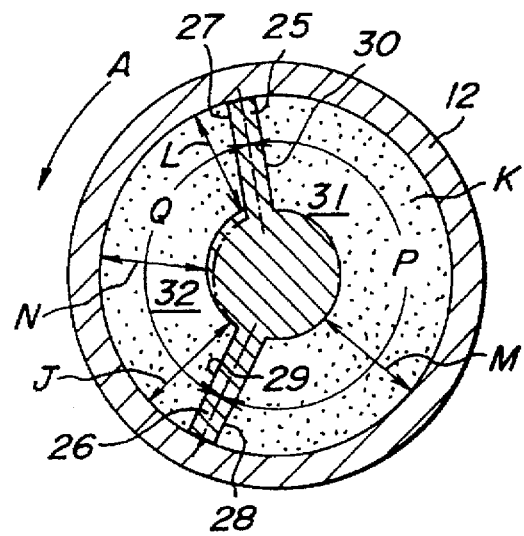
FIG_5
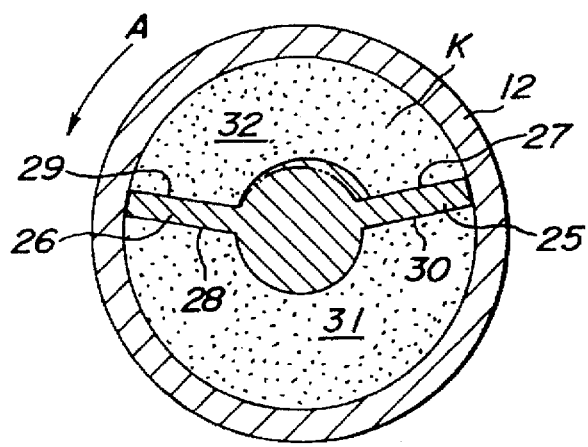
FIG_6
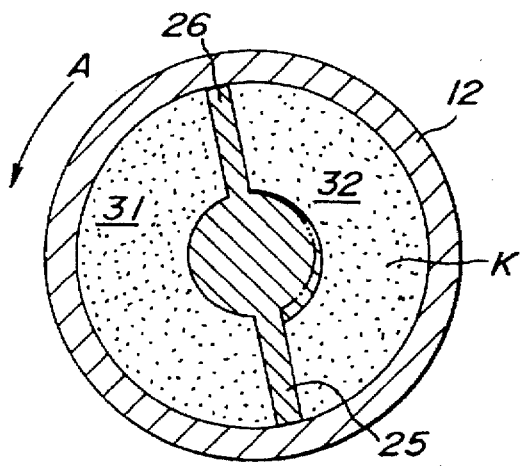
FIG_7

EXTRUSION SCREW FOR EXTRUDER

BACKGROUND OF THE INVENTION

1. Field of the Invention

The present invention relates generally to an extruder for plastic material, and specifically to an extrusion screw which is arranged in a cylinder barrel of the extruder for discharging plastic material from an extrusion die at a downstream end of the barrel.

2. Description of Related Art

As generally known in the art, an extruder includes an extrusion screw which is arranged in a cylinder barrel having a downstream end portion which is provided with an extrusion die head and an extrusion die. The extrusion screw is driven for rotation so that a plastic material which has been charged into the cylinder barrel is advanced toward the downstream end portion of the cylinder barrel, passed through the die head and discharged from an orifice in the die. The plastic material extruded from the die orifice may be in the form of a band member having a substantially rectangular cross-section.

Generally, an extrusion screw is comprised of a screw shaft and a flight which is helically provided on the outer peripheral surface of the screw shaft along the entire length thereof. The flight has a radially outer peripheral edge which is in a sliding contact with the inner peripheral surface of the cylinder barrel. A helical flight groove is formed between a front wall surface of the flight and a rear wall surface of adjacent turn of the flight, wherein the front and rear wall surfaces are defined with reference to the rotational direction of the extrusion screw, and are thus situated on the downstream side and the upstream side, respectively. Such an extrusion screw suffers from a problem that the band member extruded from the die orifice has a significant fluctuation in thickness at its side edges.

More particularly, it is known in the art that a plastic material adjacent to the front wall surface of the flight is applied with a relatively high extrusion force whereas the plastic material adjacent to the rear wall surface of the flight is applied with a relatively low extrusion force. As a result, when the flight is rotated and the front wall surface of the flight gradually approaches a side edge of the band member, there takes place a gradual increase in pressure and flow rate of the plastic material supplied to that side edge of the die orifice which corresponds to the side edge of the band member. In this instance, a band member is extruded to have a side edge region with a gradually increasing thickness. When the flight is further rotated and the front wall passes and gradually moves away from the side edge of the band member, there takes place a gradual decrease in pressure and flow rate of the plastic material supplied to the corresponding side edge of the die orifice. In this instance, the band member as extruded has a side edge region with a gradually decreasing thickness. Since the extrusion screw is rotated continuously, the front wall surface of the flight is moved back and forth relative to the side edge of the band member. Therefore, the band member has a side edge which is comprised of a relatively thick-walled side edge region and a successive, relatively thin-walled side edge region which are alternately arranged with each other. The fluctuation in thickness along one side edge of the band member is opposite in phase to the fluctuation along the other side edge of the band member.

In an attempt to eliminate or mitigate undesirable fluctuation in thickness of the band member along its side edges, there has been proposed an extrusion screw which includes a main flight and an auxiliary flight both helically provided on the outer peripheral surface of the screw shaft, each having a radially outer peripheral edge which is in sliding contact with the inner peripheral surface of the cylinder barrel. The main flight extends substantially along the entire length of the screw shaft, while the auxiliary flight is arranged only in the downstream end region of the screw shaft and extends axially over one pitch of the main flight. The auxiliary flight has a trailing end which is spaced from the trailing end of the main flight by a half turn in the rotational direction of the screw shaft. Thus, when the main flight is situated close to one side edge of the band member, the auxiliary flight is situated close to the other edge of the band member so that plastic material is fed to the other side edge with increased flow rate and pressure, which would be reduced in the case of a screw shaft with a main flight only. It was intended that the auxiliary flight serves more or less to compensate for the reduction in flow rate and pressure of plastic material supplied to the side edge region of the band member, so as to improve the dimensional uniformity and product quality of the extruded band member.

However, in the case of an extrusion screw in which the screw shaft is provided with main and auxiliary flights, it has been revealed that the auxiliary flight itself exerts a resistance to the plastic material flowing through the auxiliary flight groove between the front wall surface of the auxiliary flight and the rear wall surface of the main flight, the flow rate and pressure of the plastic material in the auxiliary flight groove are not as high as expected and it has been found still difficult to satisfactorily mitigate the fluctuation in thickness of the band member at its side edges.

SUMMARY OF THE INVENTION

It is threfore an object of the present invention to provide an extrusion screw for extruders, which effectively suppresses fluctuation in thickness of the side edges of the band member as it is extruded form the die orifice.

Briefly stated, according to the present invention, there is provided an extrusion screw for an extruder, which is arranged in a cylinder barrel having a downstream end portion provided with an extrusion die head and an extrusion die. The extrusion screw is adapted to be driven and thereby rotated so as to force a plastic material fed into the cylinder barrel toward the downstream end portion of the cylinder barrel and discharge the plastic material from the die through the die head. The extrusion screw comprises a screw shaft rotatably arranged in the cylinder barrel, a main flight helically provided on an outer peripheral surface of the screw shaft to extend substantially along the entire length thereof; wherein the main flight has a radially outer edge which is in sliding contact with an inner peripheral surface of the cylinder barrel, as well as a trailing end. The extrusion screw further comprises an auxiliary flight helically provided on the outer peripheral surface of the screw shaft, wherein the auxiliary flight has a radially outer edge which is in sliding contact with the inner peripheral surface of the cylinder barrel, as well as a leading end and a trailing end. The trailing end of the auxiliary flight is spaced from the trailing end of the main flight by a half turn in a circumferential direction of the screw shaft. A main flight groove is formed between a front wall surface of the main flight and a rear wall surface of the auxiliary flight to have a first cross-sectional area. An auxiliary flight groove is formed between a front wall surface of the auxiliary flight and a rear wall surface of the main flight to have a second cross-sectional area, wherein the second cross-sectional area decreases in a direction from the leading end to the trailing end of the auxiliary flight.

With the above-mentioned arrangement of the extrusion screw according to the present invention, the cross-sectional area of the auxiliary flight groove decreases in a direction from the leading end to the trailing end of the auxiliary flight. Furthermore, the cross-sectional area of the auxiliary flight groove at the leading end of the auxiliary flight is greater than that of the main flight groove. It is thus possible to achieve a larger flow rate and a higher pressure of plastic material distribute into the auxiliary flight groove, as compared to those available by the above-mentioned prior art arrangement. As a result, when the mail flight approaches to one side edge of the band member as it is being extruded, supplying a sufficient amount of plastic material to that side, the auxiliary flight approaches to the other side edge of the band member to supply thereto an increased amount of plastic material with a higher flow rate and pressure, so as to effectively eliminate or mitigate undesirable reduction or fluctuation in thickness at the side edge of the band member, thereby achieving a satisfactory dimensional uniformity and an improved quality of the extruded product.

Advantageously, the leading end of the auxiliary flight is spaced from the main flight by a first angle measured in a rotational direction of the screw shaft, and by a second angle measured in a direction opposite to the rotational direction of the screw shaft, wherein the first angle is larger than the second angle. Additionally, or alternatively, the auxiliary flight groove may have a depth which is larger than the depth of the main flight groove.

BRIEF DESCRIPTION OF THE DRAWINGS

The present invention will now be explained in further detail hereinafter, by referring to the accompanying drawings, in which:

FIG. 1 is a longitudinal-sectional view showing the extrusion screw for an extruder according to a preferred embodiment of the present invention;

FIG. 2 is a cross-sectional view taken along the line 2—2 in FIG. 1;

FIG. 3 is a cross-sectional view taken along the line 3—3 in FIG. 1;

FIG. 4 is a developed view of the extrusion screw shown in FIG. 1; and

FIGS. 5 to 7 are cross-sectional views taken along the lines 5—5, 6—6 and 7—7, respectively.

DESCRIPTION OF THE PREFERRED EMBODIMENT

Referring now to the drawings, there is shown in FIG. 1 an extruder according to one embodiment of the present invention, which is denoted as a whole by reference numeral 11. The extruder 11 includes a cylinder barrel 12 of substantially cylindrical shape, as well as an extrusion screw 13 which is arranged in the cylinder barrel 12 so that it can be driven for rotation by a driving motor, not shown. The cylinder barrel 12 has an upstream portion on the right side in FIG. 1, which is provided with a hopper 14 for a plastic material K, such as kneaded rubber or the like. The plastic material K in the hopper 14 can be charged into the cylinder barrel 12 and forced by the extrusion screw 13 toward the downstream portion of the cylinder barrel 12 on the left side in FIG. 1, as the extrusion screw 13 is rotated in a direction shown by arrow A in FIG. 1.

A die head 17 is fixedly secured to the downstream end of the cylinder barrel 12, and has a passage 18 for passing the plastic material K therethrough. The passage 18 is in communication with the interior of the cylinder barrel 12, and has a cross-section which gradually changes in the longitudinal direction of the passage 18 toward the downstream end thereof. Specifically, the passage 18 has a substantially circular cross-section at its upstream end region adjacent to the downstream end of the cylinder barrel 12, and a flattened cross-section at its downstream end region with an increased width and a decreased height, as shown in FIG. 2. A die plate 19 is fixedly secured to the die head 17, and has an orifice 20 which is in communication with the passage 18 in the die head 17. The orifice 20 has a rectangular cross-section which corresponds to the cross-section of the plastic material K as it is extruded from the orifice 20. Thus, when the plastic material K is continuously extruded from the orifice 20, the plastic material K forms a continuous band member B having a substantially rectangular cross-section.

As shown in FIG. 1, the extrusion screw 13 is comprised of a screw shaft 24 of a hollow- or solid-cylindrical shape, which is coaxial to the cylinder barrel 12. The screw shaft 24 has an outer peripheral surface on which a fin-like main flight 25 is helically provided to extend substantially along the entire length of the screw shaft 24. The main flight 25 has a radially outer edge which is in sliding contact with the inner peripheral surface of the cylinder barrel 12.

The screw shaft 24 has an end surface 24a which is situated adjacent to the die head 17. As shown in FIG. 4 which is a developed view of the extrusion screw 13, the main flight 25 has a trailing end 25a which is situated on the end surface 24a of the screw shaft 24. Similarly, the auxiliary flight 26 has a trailing end 26a which, too, is situated on the end surface 24a of the screw shaft 24. The trailing end 26a of the auxiliary flight 26 is spaced from the trailing end 25a of the main flight 25 by a half turn in the circumferential direction of the screw shaft 24. That is to say, the angular distance between the trailing ends 25a, 26a of the main and auxiliary flights 25, 26 is 180°.

It can be appreciated from FIG. 4, that the auxiliary flight 26 does not extend in parallel with the main flight 25. With reference to the longitudinal axis of the screw shaft 24, the auxiliary flight 26 forms a helical angle S while the main flight 25 forms a larger helical angle T. As seen in a direction from the trailing end 26b to the leading end 26a of the auxiliary flight 26, the auxiliary flight 26 gradually approaches to the front wall surface 27 of the main flight 25. Here, the front side of the main and auxiliary flights 25, 26 is defined with reference to the rotational direction of the extrusion screw 13, and denotes a wall of the relevant flight which is situated on the downstream side of the cylinder barrel 12. As a result, as best illustrated by FIG. 5, in the region of the auxiliary flight 26 which is situated on the upstream side of its trailing end 26a, the angular distance P between the main flight 25 and the auxiliary flight 26 as measured in the rotational direction A of the extrusion screw 13 is larger than the angular distance Q between these flights 25, 26 as measured in a direction opposite to the rotational direction A of the extrusion screw 13. Moreover, as best illustrated by successive FIGS. 5, 6, and 7, the difference P-Q between these angular distances P, Q decreases as seen in the direction from the leading end 26a to the trailing end 26b of the auxiliary flight 26.

An auxiliary flight groove 31 is formed between the front wall surface 28 of the auxiliary flight 26 and the rear wall surface 30 of the main flight 25. A main flight groove 32 is formed between the front wall surface 27 of the main flight 25 and the rear wall surface 29 of the auxiliary flight 26. The main flight groove 32 has a depth N which assumes a value L at a location adjacent to the front wall surface 27 of the main flight 25. The depth N of the main flight groove 32 may be gradually increased in the rotational direction A of the extrusion screw 13 so that it assumes an increased value J at a location adjacent to the rear wall surface 29 of the auxiliary flight 26. In this instance, the depth N of the main flight groove 32 may be defined as a mean value of the depth values L and J. On the other hand, the auxiliary flight groove 31 has a depth M of a value J which may be constant at any angular position of the groove 31.

As an alternative arrangement, however, the main flight groove 32 may have a depth N of a constant value, e.g., the above-mentioned value L, at any angular position of the groove 32.

The operation and function of the extruder according to the illustrated embodiment will be explained below.

It is assumed that the extrusion screw 13 is driven by an electric motor, not shown, and thereby rotated in the normal rotational direction A. As a result, the plastic material K charged from the hopper 14 into the cylinder barrel 12 is forced or advanced by the extrusion screw 13 toward the downstream side of the barrel 12. Subsequently, the plastic material K is passed through the passage 18 of the die head 17, and then fed to the extrusion orifice 20 of the die plate 19 and discharged or extruded therefrom, to form a continuous band member B of a rectangular cross-section.

As the plastic material K is advanced toward the downstream side of the barrel 12 and reaches a location adjacent to the leading end 26b of the auxiliary flight 26, the plastic material K is distributed and caused to flow into the main flight groove 32 and the auxiliary flight groove 31. As explained above, the angular distance P between the main flight 25 and the auxiliary flight 26 in the rotational direction A of the extrusion screw 13 is larger than the angular distance Q between these flights 25, 26 in the opposite direction. This means that the auxiliary flight groove 31 has a cross-sectional area which is larger than the cross-sectional area of the main fight groove 32 at the location adjacent to the leading end 26b of the auxiliary flight 26. Therefore, the flow rate of the plastic material K distributed into the auxiliary flight groove 31 is increased with reference to the flow rate which would be available by a conventional auxiliary flight groove. It is thus possible to realize the desired thickness t of the band member B at its one side edge Ba, even when the main fight 25 is situated close to that side of the die orifice 20 which corresponds to the other side edge Bb of the band member B. On such occasion, the side edge Ba of the band member B would have a reduced thickness in the case of a conventional extrusion screw having a main flight only. This applies to the other side edge Bb of the band member B when the extrusion screw 13 has been rotated by 180°. It is therefore possible to effectively prevent the above-mentioned periodical fluctuation or reduction of the thickness of the band member B at its side edges Ba, Bb.

Moreover, because the trailing end 26a of the auxiliary flight 26 is spaced in the circumferential direction from the trailing end 25a of the main flight 25 by a half turn, as explained above, the auxiliary flight 26 is spaced from the front wall surface 27 of the main flight 25 by a gradually increased distance as seen in the direction from the leading end 26b to the trailing end 26a of the auxiliary flight 26. This means that the cross-sectional area of the auxiliary flight groove 31 is gradually decreased toward the trailing end 26a. As a result, the plastic material K flowing through the auxiliary flight groove 31 is gradually compressed to exhibit a pressure which is gradually increased toward the trailing end 26a. It is therefore possible to realize the desired thickness t of the band member B at its side edges Ba, Bb, which would be reduced in the case of a conventional extrusion screw having a main flight only, thereby effectively preventing periodical fluctuation or reduction in thickness of the band member B at its side edges Ba, Bb.

In the illustrated embodiment, furthermore, the depth M of the auxiliary flight groove 31 is larger than the depth N of the mail flight groove 32, so that the auxiliary groove has a cross-sectional area which is larger than that of the main flight groove 32. Such an arrangement ensures that the flow rate of the plastic material K flowing through the auxiliary flight groove 31 is increased as compared to the flow rate which was available by a conventional arrangement wherein the auxiliary groove has a cross-sectional area which is substantially same as that of the main flight groove. This also serves to realize the desired thickness t of the band member B at its side edges Ba, Bb, without undesirable fluctuation or reduction.

In order to confirm the functional advantages of the arrangement according to the present invention, experiments were conducted with three different samples of extrusion screws X, Y and Z. The first sample X has only a main flight on the screw shaft. The second sample Y has a main flight and an auxiliary flight on the screw shaft, wherein the auxiliary flight extends over a length corresponding to one pitch of the main flight, at a helical angle S which is same as the helical angle T of the main flight, and wherein the auxiliary flight groove has a depth M which is same as the depth N of the main flight groove. The third sample Z has a main flight and an auxiliary flight on the screw shaft, wherein the auxiliary flight extends over a length corresponding to one pitch of the main flight, at a helical angle S having a difference of 5° relative to the helical angle T of the main flight, and wherein the auxiliary flight groove has a depth M having a mean difference of 2.5 mm relative to the depth N of the main flight groove. These samples X, Y and Z of extrusion screws are of the basically same specification, suitable for forming a band member B having a maximum mean gauge (thickness) of 30 mm and a width of 680 mm. With these sample extrusion screws, a plastic material has been extruded from the die to form a band member of the above-mentioned nominal dimension. Subsequently, for each of the extruded band members, measurement was conducted to ascertain the so-called gauge difference between the right and left side edges at a location corresponding to the maximum gauge portion of the band member B. By way of example, the gauge difference is the difference between the maximum thickness at one side edge of the band and the thickness of the opposite side edge at the same longitudinal location. The gauge difference was as high as 5.5 mm in the case of the sample extrusion scores X, but reduced to 1.03 mm in the case of the sample extrusion screw Y, and further to 0.63 mm in the case of the sample extrusion screw Z. It has been clearly confirmed that the present invention effectively minimizes the fluctuation in thickness of the extruded band member.

It will be appreciated from the foregoing detailed description that the present invention serves to suppress or minimize undesirable fluctuation in thickness at the side edges of the band member as it is extruded, so as to realize a satisfactory dimensional uniformity and an improved quality of the extruded product.

While the present invention has been described above with reference to a specific embodiment illustrated in the drawings, it is of course that various modifications and/or alterations may be made without departing from the scope of the invention as defined by the appended claims.

For example, the illustrated embodiment is featured by an arrangement wherein the auxiliary flight gradually approaches to the front wall surface of the main flight as seen in the direction from the trailing end to the leading end of the auxiliary flight, so that the angular distance P of between the leading end and the main flight in the rotational direction of the screw shaft may be made larger than the angular distance Q measured in a direction opposite to the rotational direction of the screw shaft. However, it is also possible to realize an angular distance P which is larger than the angular distance Q, by stepwisely decreasing the angular distance between the two flights as seen in the direction from the trailing end to the leading end of the auxiliary flight, or by forming the auxiliary flight to have a leading end region which is inclined relative to the main flight, thereby approaching to the main flight toward the leading end of the auxiliary flight, as well as a trailing end region which extends in parallel with the main flight. Also, the extrusion screw according to the present invention may be used in combination with an extruder which includes an extrusion die having two or more orifices so as to extrude a plurality of band members which are adjacent to each other.

We claim:

1. An extrusion screw for an extruder, which is arranged in a cylinder barrel having a downstream end portion provided with an extrusion die head and an extrusion die, said extrusion screw being adapted to be driven and thereby rotated so as to force a plastic material fed into the cylinder barrel toward the downstream end portion of the cylinder barrel and discharge the plastic material from the die through the die head, said extrusion screw comprising:

a screw shaft rotatably arranged in said cylinder barrel;

a main flight helically provided on an outer peripheral surface of the screw shaft to extend substantially along the entire length thereof, said main flight having a radially outer edge which is in sliding contact with an inner peripheral surface of said cylinder barrel, said main flight further having a trailing end;

an auxiliary flight helically provided on said outer peripheral surface of the screw shaft, said auxiliary flight having a radially outer edge which is in sliding contact with said inner peripheral surface of the cylinder barrel, said auxiliary flight further having a leading end and a trailing end, said trailing end of the auxiliary flight being spaced from said trailing end of the main flight by a half turn in a circumferential direction of the screw shaft;

a main flight groove formed between a front wall surface of the main flight and a rear wall surface of the auxiliary flight to have a first cross-sectional area; and an auxiliary flight groove formed between a front wall surface of the auxiliary flight and a rear wall surface of the main flight to have a second cross-sectional area, said second cross-sectional area decreasing in a direction from said leading end to said trailing end of the auxiliary flight.

2. An extrusion screw according to claim 1, wherein said leading end of the auxiliary flight is spaced from said main flight by a first angle measured in a rotational direction of the screw shaft, and by a second angle measured in a direction opposite to said rotational direction of the screw shaft, said first angle being larger than said second angle.

3. An extrusion screw according to claim 1, wherein said main flight groove has a first depth and said auxiliary flight groove has a second depth which is larger than said first depth.

4. An extrusion screw according to claim 1, wherein said leading end of the auxiliary flight is spaced from said main flight by a first angle measured in a normal rotational direction of the screw shaft, and by a second angle measured in a reverse rotational direction of the screw shafts said first angle being larger than said second angle, and wherein said main flight groove has a first depth and said auxiliary flight groove has a second depth which is larger than said first depth.

5. An extrusion screw for an extruder, which is arranged in a cylinder barrel having a downstream end portion provided with an extrusion die head and an extrusion die, said extrusion screw being adapted to be driven and thereby rotated so as to force a plastic material fed into the cylinder barrel toward the downstream end portion of the cylinder barrel and discharge the plastic material from the die through the die head, said extrusion screw comprising:

a screw shaft rotatably arranged in said cylinder barrel;

a main flight helically provided on an outer peripheral surface of the screw shaft to extend substantially along the entire length thereof, said main flight having a radially outer edge which is in sliding contact with an inner peripheral surface of said cylinder barrel, said main flight further having a trailing end;

an auxiliary flight helically provided on said outer peripheral surface of the screw shaft, said auxiliary flight having a radially outer edge which is in sliding contact with said inner peripheral surface of the cylinder barrel, said auxiliary flight further having a trailing end which is spaced from said trailing end of the main flight by a half turn in a circumferential direction of the screw shaft;

said auxiliary flight further having a leading end which is spaced from said main flight by a first angle measured in a rotational direction of the screw shaft, and by a second angle measured in a direction opposite to said rotational direction of the screw shaft, said first angle being larger than said second angle.

6. An extrusion screw according to claim 5, wherein a main flight groove is formed between a front wall surface of the main flight and a rear wall surface of the auxiliary flight to have a first depth, and an auxiliary flight groove is formed between a front wall surface of the auxiliary flight and a rear wall surface of the main flight to have a second depth, said second depth being larger than said first depth.

7. An extrusion screw for an extruder, which is arranged in a cylinder barrel having a downstream end portion provided with an extrusion die head and an extrusion die, said extrusion screw being adapted to be driven and thereby rotated so as to force a plastic material fed into the cylinder barrel toward the downstream end portion of the cylinder barrel and discharge the plastic material from the die through the die head, said extrusion screw comprising:

a screw shaft rotatably arranged in said cylinder barrel;

a main flight helically provided on an outer peripheral surface of the screw shaft to extend substantially along the entire length thereof, said main flight having a radially outer edge which is in sliding contact with an inner peripheral surface of said cylinder barrel, said main flight further having a trailing end;

an auxiliary flight helically provided on said outer peripheral surface of the screw shaft, said auxiliary flight having a radially outer edge which is in sliding contact with said inner peripheral surface of the cylinder barrel, said auxiliary flight further having a trailing end which is spaced from said trailing end of the main flight by a half turn in a circumferential direction of the screw shaft;

a main flight groove formed between a front wall surface of the main flight and a rear wall surface of the auxiliary flight to have a first depth; and an auxiliary flight groove formed between a front wall surface of the auxiliary flight and a rear wall surface of the main flight to have a second depth, said second depth being larger than said first depth.

8. An extruder comprising:

a cylinder barrel having a downstream end portion provided with an extrusion die head and an extrusion die; and an extrusion screw which is arranged in the cylinder barrel and adapted to be driven and thereby rotated so as to force a plastic material fed into the cylinder barrel toward the downstream end portion of the cylinder barrel and discharge the plastic material from the die through the die head, said extrusion screw comprising:

(i) a screw shaft rotatably arranged in said cylinder barrel;

(ii) a main flight helically provided on an outer peripheral surface of the screw shaft to extend substantially along the entire length thereof; said main flight having a radially outer edge which is in sliding contact with an inner peripheral surface of said cylinder barrel, said main flight further having a trailing end;

(iii) an auxiliary flight helically provided on said outer peripheral surface of the screw shaft, said auxiliary flight having a radially outer edge which is in sliding contact with said inner peripheral surface of the cylinder barrel, said auxiliary flight further having a leading end and a trailing end, said trailing end of the auxiliary flight being spaced from said trailing end of the main flight by a half turn in a circumferential direction of the screw shaft;

(iv) a main flight groove formed between a front wall surface of the main flight and a rear wall surface of the auxiliary flight to have a first cross-sectional area; and (v) an auxiliary flight groove formed between a front wall surface of the auxiliary flight and a rear wall surface of the main flight to have a second cross-sectional area, said second cross-sectional area decreasing in a direction from said leading end to said trailing end of the auxiliary flight.

9. An extruder according to claim 8, wherein said leading end of the auxiliary flight is spaced from said main flight by a first angle measured in a rotational direction of the screw shaft, and by a second angle measured in a direction opposite to said rotational direction of the screw shaft, said first angle being larger than said second angle.

10. An extruder according to claim 8, wherein said main flight groove has a first depth, and said auxiliary flight groove has a second depth which is larger than said first depth.

11. An extruder according to claim 8, wherein said leading end of the auxiliary flight is spaced from said main flight by a first angle measured in a rotational direction of the screw shaft, and by a second angle measured in a direction opposite to said rotational direction of the screw shaft, said first angle being larger than said second angle, and wherein said main flight groove has a first depth and said auxiliary flight groove has a second depth which is larger than said first depth.

* * * * *